US006366615B2

(12) United States Patent
Kato et al.

(10) Patent No.: US 6,366,615 B2
(45) Date of Patent: *Apr. 2, 2002

(54) MOVING PICTURE CODING METHOD, MOVING PICTURE DECODING METHOD, AND APPARATUS THEREFOR

(75) Inventors: Motoki Kato; Yoichi Yagasaki; Jun Yonemitsu, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/229,699

(22) Filed: Jan. 13, 1999

Related U.S. Application Data

(63) Continuation of application No. 08/341,550, filed on Feb. 8, 1995, which is a continuation-in-part of application No. PCT/JP94/00485, filed on Mar. 25, 1994.

(30) Foreign Application Priority Data

Mar. 25, 1993 (JP) ............................................. 5-066818

(51) Int. Cl.[7] ................................................. H04N 7/18
(52) U.S. Cl. ............................. 375/240.14; 375/240.13
(58) Field of Search ................................ 348/416, 415, 348/412, 384, 423, 464, 420, 699, 700, 421, 845.1, 845.2; 375/240.01–240.29

(56) References Cited

U.S. PATENT DOCUMENTS 5,371,547 A  * 12/1994  Siracusa et al. ............ 348/426
5,455,629 A  * 10/1995  Sun et al. .................... 348/466
5,568,200 A  * 10/1996  Pearlstein et al. .......... 348/426
5,666,162 A  *  9/1997  Iizuka ......................... 348/415

* cited by examiner

*Primary Examiner*—Andy Rao
(74) *Attorney, Agent, or Firm*—Frommer Lawrence & Haug LLP; William S. Frommer; Dennis M. Smid

(57) ABSTRACT

A moving picture coding apparatus for coding a moving picture and a moving picture decoding apparatus for decoding a coded moving picture are provided. The moving picture coding apparatus is operative to divide a picture signal of a picture frame of N pixels×M lines (horizontal N pixels, vertical M lines) to be coded between a first picture portion serving as the inside picture portion having picture frame of $N_1$ pixels×$M_1$ lines ($N_1 \leq N$, $M_1 \leq M$) and a second picture portion serving as picture portion outside the first picture portion to divide the first and second picture portions in independent predetermined divisional units comprised of a plurality of pixels, and to add peculiar discrimination codes to headers of divisional units in transmitting coded information of predetermined divisional units belonging to the second picture portion.

The moving picture decoding apparatus is operative so that when only decoding ability of picture frame of $N_1$ pixels× $M_1$ lines is provided, it reproduces only the first picture portion, and detects any one of discrimination codes added to headers of predetermined divisional units comprised of a plurality of pixels belonging to the second picture portion with respect to the second picture portion to discriminate it, thus to read, in a skipped manner, coded information of the second picture portion.

24 Claims, 11 Drawing Sheets

VIDEO SEQUENCE LAYER

GOP LAYER

PICTURE LAYER

LUMINANCE (Y)

SLICE LAYER

MACRO BLOCK LAYER

BLOCK LAYER

8 LINES

8 PIXELS

⟨FRAME⟩

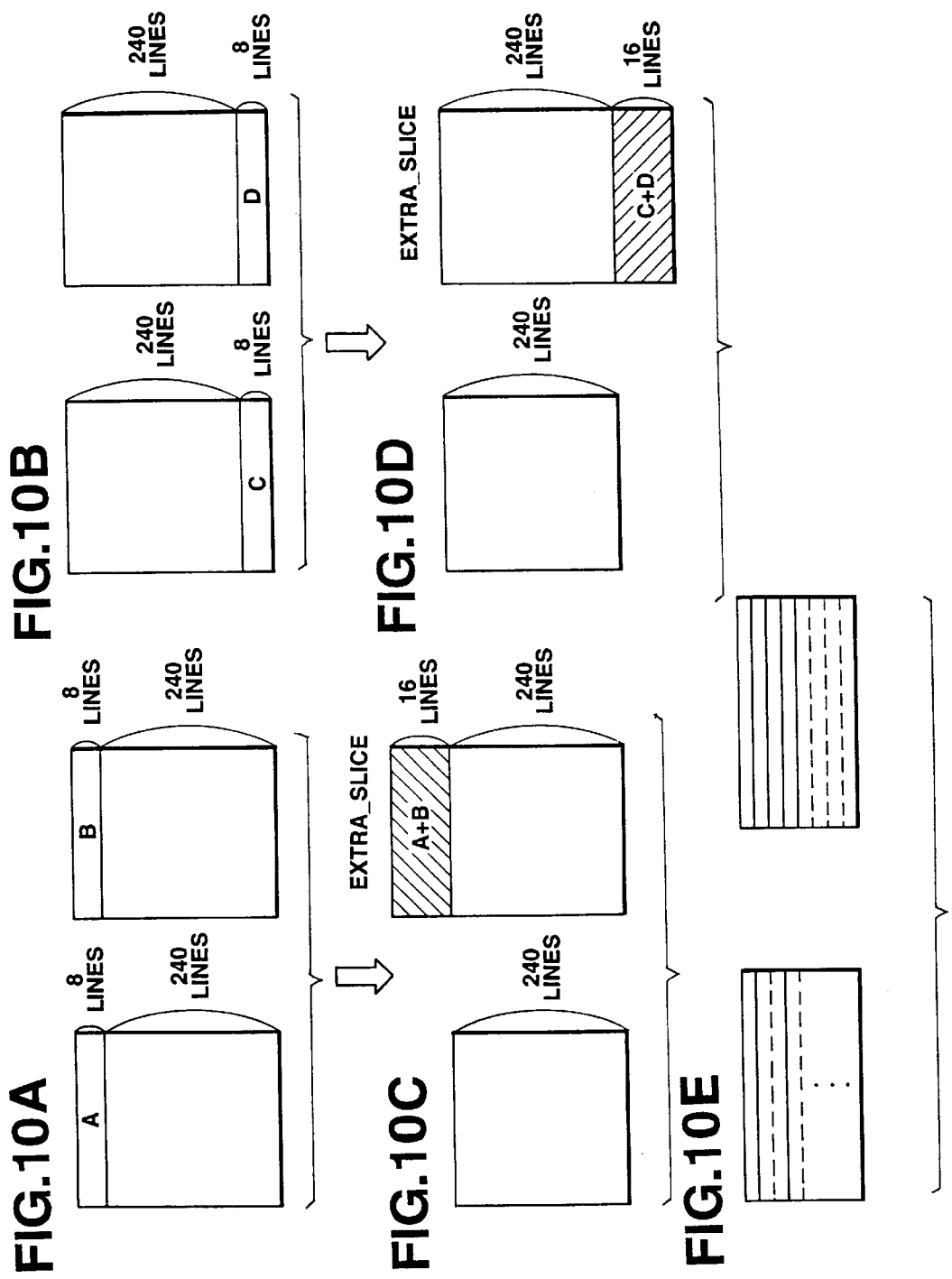

FIG.11A
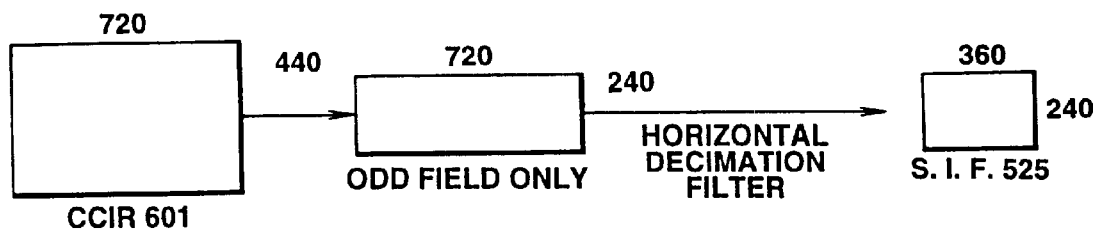
FIG.11B
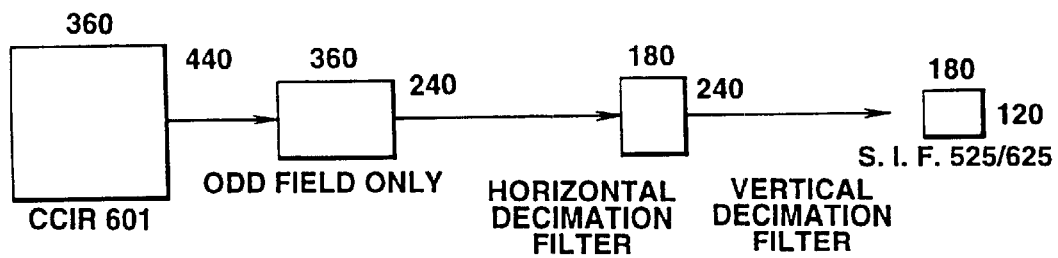
| -29 | 0 | 88 | 138 | 88 | 0 | -29 | // 256 |
FIG.12

MOVING PICTURE CODING METHOD, MOVING PICTURE DECODING METHOD, AND APPARATUS THEREFOR

This application is a con of Ser. No. 08/341,550 filed Feb. 8, 1995, which is a CIP of PCT/JP94/00485 filed Mar. 25, 1994.

TECHNICAL FIELD

This invention relates to a moving picture coding method for coding a moving picture, a moving picture decoding method for decoding a coded moving picture, and apparatuses therefor.

BACKGROUND ART

In the case of digitizing a signal of a moving picture to record and transmit digital data thus obtained, its data quantity becomes extremely large. For this reason, coding (compression) is implemented to that data. As a representative coding system, there is so called MPEG (Moving Picture Expert Group) system. This MPEG is general name of the moving picture coding system which has progressed in WG (Working Group) 11 of SC (Sub Committee) 29 of JTC (Joint Technical Committee) 1 of ISO (International Standardization Organization) and IEC (International Electrotechnical Commission).

Moreover, as a widely known format in the case of handling a picture signal by a digital signal, there is Recommendation 601 (Rec. 601) of so called CCIR (Comite Consultatif Internationale des Radio-communications (International Radio Consultative Committee)). This Rec. 601 is the worldwide standardized format of digital picture based on the component (so called 4:2:2 component) coding system.

In the MPEG, the above-mentioend Rec. 601 format is used as input/output picture format. In the NTSC zone of the scanning line 525 lines/30 Hz, an input/output picture format as shown in FIG. 11, for example, has been most popularly used. For example, in MPEG2 (MPEG phase-2), picture of picture frame of frame of 720 pixels×480 lines of Rec. 601 format is handled. On the other hand, in MPEG1 (MPEG phase-1), picture of picture frame of frame (SIF) of 360 pixels×240 lines obtained by thinning pixels so that resolutions in the longitudinal and lateral directions are respectively equal to one half thereof is handled.

A technique to allow the transmission format of picture to have a relationship such that the ratio between length and breadth of picture frame is expressed as 1:2 in dependency upon difference of resolution is convenient in a hierarchical manner. This is related to the following two reasons.

First reason is that hardware configuration of thinning filter and/or interpolating filter having ratio of 1:2 are simpler than those of filters having other ratios.

Second reason is that, in the case of constituting picture coding/decoding apparatuses, it is possible to process picture data by four image LSIs disposed in parallel for picture having resolution which is one half of picture to be processed.

An example of filter coefficients of the thinning filter is shown in FIG. 12.

Moreover, since there is employed a scheme to handle picture in a manner divided into small blocks called macro blocks of 16 pixels×16 lines, it is preferable that the horizontal and vertical sizes of picture are multiple of 16 when coding efficiency is taken into consideration. From a viewpoint of this, picture frame size of 720 (=16×45) pixels×480 (16×30) lines is preferable size. For reasons described above, in the NTSC zone, picture of picture frame of frame of 720 pixels×480 lines of Rec. 601 format has been widely handled.

On the other hand, CCIR recommended broadcasting stations (television stations) that picture signals of 483 lines or more (about 483~486 lines) must be transmitted in the standard television broadcasting in the NTSC zone. At this time, if picture coding is carried out by MPEG as in the prior art, it is required to increase the number of macro blocks by one column in a longitudinal direction to carry out processing of 720 pixels×496 (480+16) lines. This results in requirement of increase in the coding processing ability of about 3.5% as compared to the case where frame of 720 pixels×480 lines is handled.

This is inconvenient for a system only having a decoding apparatus which can merely handle so far as picture of picture frame of frame of 720 pixels×480 lines. For example, when the recording system of the digital video disc and the broadcasting system of the digital television are the same MPEG, it is considered that there results the merit that it is sufficient to have only either one of decoding apparatuses. However, in the case where decoding apparatus of video disc player has only processing ability of picture frame of 720 pixels×480 lines, it is unable to receive picture signals in digital television broadcasting by that decoding apparatus. This gives rises to extremely waste from a viewpoint of effective utilization of hardware resource.

Meanwhile, CCIR only recommended that picture signals of 483 lines or more (about 483~486 lines) in the standard television broadcasting in the NTSC zone must be transmitted, but whether or not the receiving side decodes picture information of 480 lines or more is arbitrary. For this reason, in the case where, the receiving side is a decoding apparatus having only processing ability of picture frame of 720 pixels×480 lines, if it is possible to decode only such picture frame, this is very desirable.

To meet the above-described requirement, it becomes necessary to realize a moving picture coding technology required for providing moving picture coded information (broadcasting) having flexibility and a decoding method there for such that in the case where the receiving side is a decoding apparatus having processing ability of picture frame of 483 lines or more, received all picture signals can be reproduced, while in the case where the receiving side is a decoding apparatus having only processing ability of picture frame of 480 lines, only the decordable picture portion can be reproduced.

To realize this, it is necessary to solve problems described below.

First, such a task must be accomplished to permit discrimination as to whether or not only picture information of reproducible picture frame is taken out from received coded information.

Secondly, since in the coding method using motion compensating prediction between pictures such as MPEG, etc., pictures have correlation therebetween in a time base direction, in the case where reference is made to the outside (line portions indicated by 16 lines in the figure, for example) of the reproducible picture frame by motion compensation as shown in FIG. 13, motion compensation is unable to be carried out. As a result, decoding cannot be made. Accordingly, it is necessary to take any measure for this problem.

Namely, the case where coded information of 496 lines is received by decoder only having processing ability of picture frame of 480 lines is taken as an example in FIG. 13. In the case of the example of FIG. 13, motion compensation in directions indicated by arrows a, b in the figure from within the picture frame of 480 lines of past picture or future picture to current picture can be made, but motion compensation in directins indicated by arrows c, d in the figure from within the picture frame beyond 480 lines of past picture or future picture (line portions indicated as 16 lines in the figure) to current picture cannot be carried out.

DISCLOSURE OF THE INVENTION

In view of the above, in order to satisfy the above-mentioned requirements, an object of this invention is to provide a moving picture coding method required for providing moving picture coded information (broadcasting) having flexibility and a decoding method corresponding thereto such that in the case where the receiving side is a decoding apparatus having processing ability of picture frame of 483 lines or more, received all picture signals can be reproduced, while in the case where the recieving side is a decoding apparatus having only processing ability of picture frame of 480 lines, only the reducible picture portion can be reproduced.

This invention has been proposed in order to solve the above-described problems. A moving picture coding method of this invention comprises the steps of: dividing a picture signal of a picture frame of N pixels×M lines (horizontal N pixels, vertical M lines) to be coded between a first picture portion serving as an internal picture portion having a picture frame of $N_1$ pixels×$M_1$ lines ($N_1 \leq N$, $M_1 \leq M$) and a second picture portion serving as a picture portion outside the first picture portion; and dividing the first picture portion and the second picture portion in independent predetermined divisional units comprised of a plurality of pixels, whereby in transmitting coded information of the predetermined divisional units belonging to the second picture portion, peculiar discrimination codes are respectively added to headers of the divisional units.

In the above-mentioned moving picture coding method, at the time of motion compensating prediction, it is inhibited that the first picture portion of a current coded picture makes reference to the second picture portion of reference picture. Moreover, motion compensating prediction implemented to the second picture portion of current coded picture does not place restrictions on reference picture.

It should be noted that when size of unit block for carrying out motion compensating prediction is assumed to be $N_2$ pixels×$M_2$ lines, setting is made such that $N_1$ is multiple of $N_2$ and $M_1$ is multiple of $M_2$. In addition, setting is made such that $N_1$ and $M_1$ are both multiple of 16.

Further, a moving picture decoding method of this invention is characterized in that when only decoding ability of the picture frame of $N_1$ pixels×$M_1$ lines is provided, only the first picture portion is reproduced, and any one of peculiar discrimination codes added to headers of predetermined divisional units comprised of a plurality of pixels belonging to the second picture portion is detected with respect to the second picture portion to thereby discriminate the second picture portion, thus making it possible to read, in a skipped manner, coded information of the second picture portion.

Also in this decoding method, when size of unit block for carrying out motion compensation is assumed to be $N_2$ pixels×$M_2$ lines, $N_1$ is multiple of $N_2$ and $M_1$ is multiple of $M_2$. In addition, $N_1$ and $M_1$ are both multiple of 16.

Meanwhile, for example, in the case where a frame picture signal to be transmitted is a picture signal of 483 lines or more required for the television broadcasting of the NTSC system, the first internal picture portion becomes 480 lines.

In this case, frame picture signal of 483 lines or more required for the television broadcasting of the NTSC system is divided between a first picture portion of 480 lines and a second picture portion serving as a picture portion of the highest portion or the lowest portion of the picture except for the first picture portion, whereby when only decoding ability of picture frame of 480 lines is provided, only the first picture portion is reproduced, and any one of peculiar discrimination codes added to headers of predetermined divisional units comprised of a plurality of pixels belonging to the second picture portion is detected with respect to the second picture portion to thereby discriminate the second picture portion thus to read, in a skipped manner, coded information of the second picture portion.

In accordance with this invention, in coding moving picture, picture signal of picture frame of N pixels×M lines (horizontal N pixels, vertical M lines) to be coded is divided between first picture portion serving as the internal picture portion having picture frame of $N_1$ pixels×$M_1$ lines ($N_1 \leq N$, $M_1 \leq M$) and second picture portion serving as picture portion outside the first picture portion to divide the first picture portion and the second picture portion in independent predetermined divisional units comprised of plural pixels, whereby in transmitting coded information of the predetermined divisional units belonging to the second picture portion, peculiar discrimination codes are respectively added to headers of predetermined divisional units.

Accordingly, in the case where only decoding ability of picture frame of $N_1$ pixels×$M_1$ lines is provided when such a coded signal is decoded, only the first picture portion is reproduced, and corresponding peculiar discrimination code is detected with respect to the second picture portion to thereby discriminate the second picture portion, thus making it possible to read, in a skipped manner, coded information of that picture portion.

BRIEF DESCRIPTION OF THE DRAWINGS

FIG. 10 is a view for explaining handling of Extra Slice in picture of the field structure in this embodiment.

FIG. 11 is a view showing Rec. 601 format and SIF format.

FIG. 12 is a view showing an example of filter coefficients of the thinning filter.

BEST MODE FOR CARRYING OUT THE INVENTION

Preferred embodiments of this invention will now be described with reference to the attached drawings.

A moving picture coding apparatus (encoder) of a first embodiment to which a moving picture coding method of this invention is applied will be described in accordance with FIG. 1. It is to be noted that while this invention can be applied to the case where picture structure is both frame and field structures, the case where the picture structure is caused to be frame structure will be chiefly described in this embodiment.

Figure 1:
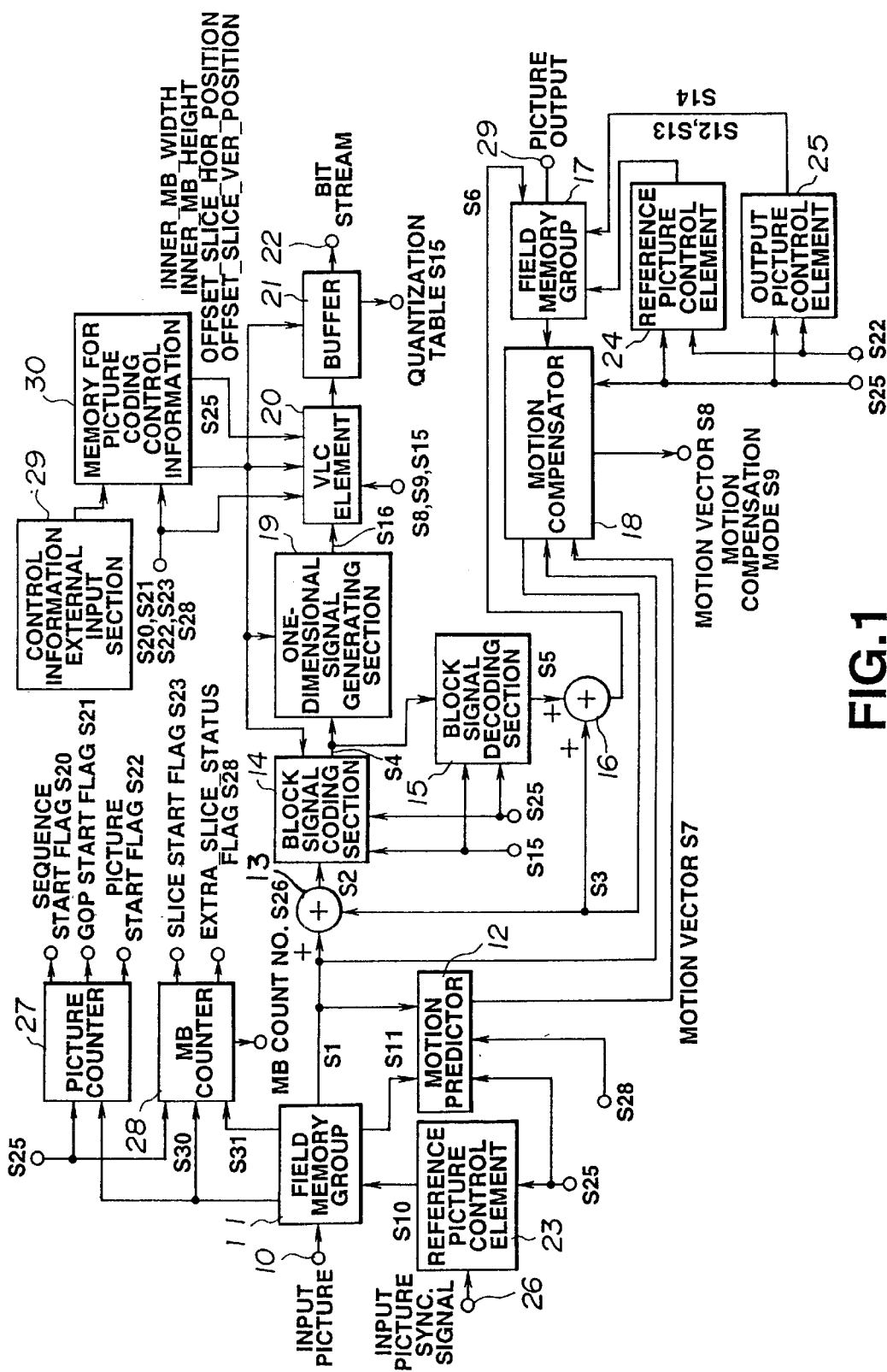
FIG. 1 is a circuit diagram showing, in a block form, a moving picture coding apparatus in a first embodiment of this invention.
Figure 2A:
FIG. 2 is a view showing data structure of MPEG 1.
Figure 2B:
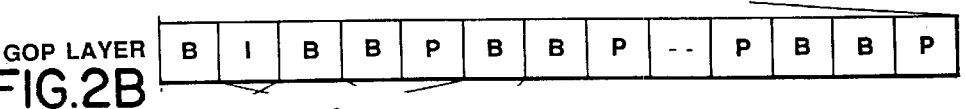
Figure 2C:
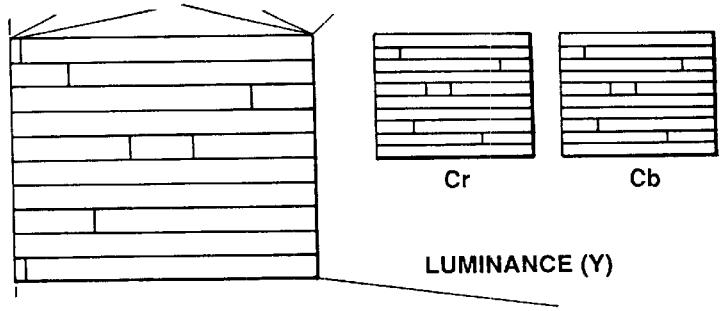
Figure 2D:
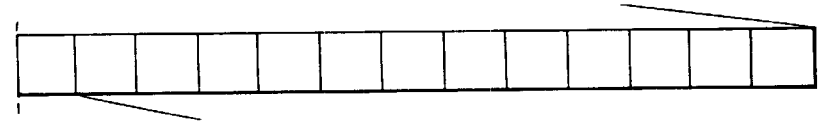
Figure 2E:
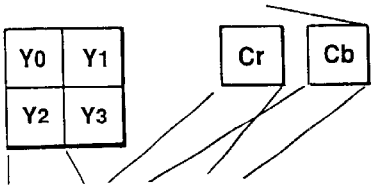
Figure 2F:
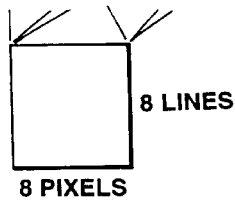

In FIG. 1, a moving picture to be coded is inputted from picture input terminal 10. Picture signal inputted from the picture input terminal 10 is delivered to field memory group 11.

In the coding apparatus of this embodiment, inputted picture is caused to undergo coding on the basis of data structure at MPEG1 as shown in FIG. 2.

Respective data layers shown in FIG. 2 in this embodiment will be briefly described.

1. Block Layer

Block of block layer is comprised of, e.g., 8 lines×8 pixels adjacent of luminance or color difference. For example, Discrete Cosine Transform (DCT) processing is carried out in this unit (block).

2. MB (Macro Block) Layer

Macro Block (MB) of macro block layer is such that in the case where, e.g., format of picture is 4:2:0 (ratio between information quantities of luminance signals and two color difference signals is 4:2:0), it is comprised of six blocks in total of four luminance blocks adjacent in left and right directions and in upper and lower directions and respective color difference blocks of Cb, Cr corresponding to the same position on picture. Transmission is made in order of Y0, Y1, Y2, Y3, Cb, Cr. What mode is used as motion compensation mode and/or whether or not it is sufficient to transmit no predictive error are judged in this unit.

3. Slice Layer

Slice layer is comprised of a single macro block or a plurality of macro blocks successive in order of scanning of picture. At the leading portion of slice, the first macro block has data indicating position within picture so that data state can return to normal state even in the case where any error takes place. For this reason, the length of slice and starting position are arbitrary, thereby making it possible to vary them in dependency upon error state of transmission path.

4. Picture Layer

Figure 3:
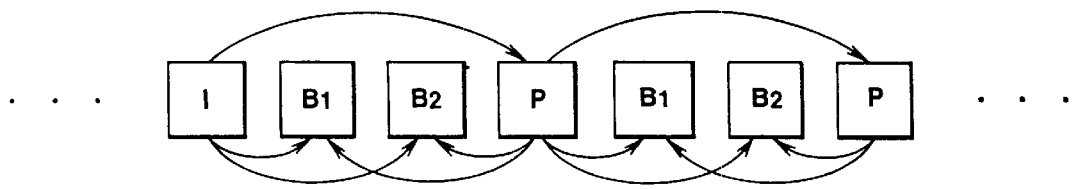
FIG. 3 is a view for explaining I, P and B pictures.

Respective pictures, i.e., individual pictures are comprised of at least one slice or a plurality of slices. In acordance with the system in which pictures are coded, respective pictures are classified into I picture (Intra-coded picture), P picture (Predictive-coded picture), B picture (Bidirectionally Predictive-coded picture). Here, I picture, P picture, and B picture will be described with reference to FIG. 3. In FIG. 3, first, as processing of the first stage, pictures indicated by "P" in the figure jumping over several pictures are caused to cyclically undergo predictive coding. Then, as processing of the second stage, pictures indicated by "B" in the figure which is put between I picture and P picture or between P pictures are predicted from P picture or I picture before and after. It is to be noted that picture indicated by "I" in the figure is intra-coded picture, and is prepared without use of motion compensation. It is to be further noted that arrows in the figure represent directions of prediction.

5. GOP Layer

GOP (Group of Picture) is comprised of single or plural I pictures, or single or plural I pictures and plural non I pictures.

6. Video Sequence Layer

Video sequence is comprised of single or plural GOPs having the same picture size and picture rate, etc.

Turning back to FIG. 1, information for controlling fundamental operation of the coding apparatus of this embodiment is given from picture coding control information input section (labeled control information external input section in the figure) 29, and is stored into memory (labeled memory for picture coding control information in the figure) 30. These information are picture frame size, output bit rate of coded information, picture structure signal (discrimination signal as to whether picture is frame structure, field structure or progressive), and picture coding type signal (discrimination signal as to whether picture is I picture, P picture or B picture), etc. These information are outputted as picture coding control signal S25.

Moreover, layers of video sequence, GOP, picture and slice of data structure at MPEG1 are such that start codes indicating that those layers start are added to the leading portions of respective layers, and header information are adapted to be transmitted after those start codes.

Timings for transmitting respective start codes are given when video sequences start flag S20, GOP start flag S21, picture start flag S22, slice start flag S23 are set, respectively. Video sequence start flag S20, GOP start flag S21 and picture start flag S22 are outputted from picture counter 27. Moreover, slice start flag S23 is outputted from MB (Macro Block) counter 28.

Picture counter 27 detects the leading portion of picture which is to be currently coded and is read out from field memory group 11 to count its number in synchronism with signal S30 outputted therefrom. Picture counter 27 is reset when coding of video sequence to be coded is started. At that time, video sequence start flag S20 is set at the same time. Picture start flag S22 is set when picture counter 27 has received the signal S30. GOP start flag S21 is set when picture count number becomes equal to multiple of GOP length (No. of pictures for preparing GOP) determined in advance. Ordinarily, GOP length is, e.g., 12 frames or 15 frames. This information is preserved in memory 30 where control information for coding of current picture is stored.

Figure 4:
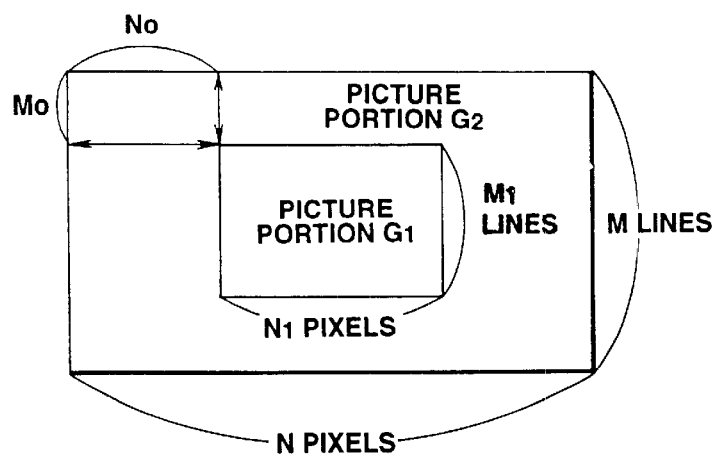
FIG. 4 is a view for explaining handling of picture in this embodiment.

In this embodiment, the coding apparatus handles picture as shown in FIG. 4.

Namely, picture signal of picture frame of N pixels×M lines (horizontal N pixels, vertical M lines) to be coded is divided between internal picture portion (first picture portion) having pixel frame of $N_1$ pixels×$M_1$ lines ($N_1 \leq N$, $M_1 \leq M$) indicated by picture portion $G_1$ and picture portion (second picture portion) outside the picture portion $G_1$, which is indicated by picture portion $G_2$, to constitute picture portion $G_1$ by one general slice or more, and to constitute picture portion $G_2$ by one Extra_Slice or more. It is to be noted that Extra_Slice is name employed in this embodiment for distinction from general slice. Extra_Slice is comprised of macro blocks (MBs) in the same manner as in the general slice.

MB (Macro Block) counter 28 is reset in response to the signal S30. MB counter 28 detects the leading portion of MB pixel signal S1 which is to be currently coded and is read out from field memory group 11 to count its number in synchronism with signal S31 outputted therefrom.

In the case where position of Macro Block (MB) to be processed shifts from picture portion $G_1$ to picture portion $G_2$; slice start flag S23 is set, and the Extra_Slice_Status_Flag S28 is set. Further, in the case where position of Macro Block (MB) to be processed shifts from picture portion $G_2$ to picture portion $G_1$, slice start flag S23 is set, and Extra_Slice_Status_Flag S28 is reset. Shift timings of positions of these Macro Blocks (MB) can be recognized by observing MB count number at MB counter 28.

Also in the case where MB count number becomes equal to multiple of slice length (No. of macro blocks for preparing slice) determined in advance, slice start flag S23 is set. In the case where otherwise, slice start flag S23 is reset. The slice length can be changed by error state of transmission path of bit stream. In general, according as error probability of transmission path becomes higher, the slice length becomes shorter. Slice length designated at this time is stored in memory 30.

When sequence start flag S20, GOP start flag S21, picture start flag S22, or slice start flag S23 is set, VLC element 20 outputs start code of corresponding layer in response thereto. Subsequently, VLC element 20 outputs therefrom, as header information, control information for coding data of corresponding layer preserved in memory 30.

Here, by introducing "Extra_Slice", bit stream syntax of sequence layer and slice layer are changed as compared to conventional MPEG1.

Bit stream syntax of sequence layer is shown in Table 1.

TABLE 1

```
sequence_header ( ) {
    sequence_header_code;                                32bit;
    horizontal_size_value;                               12bit;
    vertical_size_value;                                 12bit;
    pel_aspect_ratio;                                     4bit;
    picture_rate;                                         4bit;
    bit_rate;                                            18bit;
    marker_bit;                                           1bit;
    vbv_buffer_size;                                     10bit;
    constrained_parameter_flag;                           1bit;
    load_intra_quantizer_matrix;                          1bit;
    if(load_intra_quantizer_matrix)
        intra_quantizer_matrix[64];                    8*64bit;
    load_non_intra_quantizer_matrix;                      1bit;
    if(load_non_intra_quantizer_matrix)
        non_intra_quantizer_matrix[64];                8*64b1t;
    next_start_code();
    if(next_bits()==extension_start_code) {
        extension_start_code;                           32b1t;
        using_extra_slice_flag;                          1bit;
        if(using_extra_slice_flag) {
            inner_mb_width;                            12bit;
            inner_mb_height;                           12bit;
            offset_slice_horizontal_position;          12bit;
            offset_slice_vertical_position;            12bit;
        }
        reserved(byte_align);
        while(next_bits()!='0000 0000 0000 0000 0000 0001') {
            sequence_extension_data;                     8bit;
        }
        next_start_code();
    }
    if(nextbits()=user_data_start_code) {
        user_data_start_code;                           32bit;
        while(next_bits()!='0000 0000 0000 0000 0000 0001'){
            user data;                                    8bit;
        }
        next_start_code();
    }
}
```

In the sequence layer, information relating to positions of picture portion $G_1$ and picture portion $G_2$ are transmitted.

These information will be described below with reference to FIG. 4. The case where, e.g., size of Macro Block (MB) is 16 pixels×16 lines in FIG. 4 will now be described.

In Table 1 and FIG. 4, at sequence layer, lateral sizes (i.e. N) and longitudinal sizes (i.e. M) of all picture frames are transmitted by "horizontal_size_value", "vertical_size_value". Further, information indicating whether or not Extra_Slice is used is transmitted by flag expressed as "using_extra_slice_flag". In the case where Extra_Slice is used, lateral size and longitudinal size of picture portion $G_1$ are transmitted by "inner_mb_width", "inner_mb_height". It is to be noted that the inner_mb_width indicates No. of Macro Blocks (MBs) which fall within lateral one column of picture portion $G_1$, and the inner_mb_height indicates No. of macro blocks which fall within longitudinal one column of picture portion $G_1$. Namely, in the case where size of Macro Block (MB) is 16 pixels×16 lines, mb_width=N/16, mb_height=M/16, inner_mb_width=$N_1$/16, and inner_mb_height=$M_1$/16.

Further, position information of picture portion $G_1$ within N pixels×M lines of the entire picture frame is transmitted by "offset_slice_horizontal_position", "offset_slice_vertical_position". Namely, "offset_slice_horizontal_position", is $N_0$/16 and "offset_slice_vertical_position" is $M_0$/16.

Bit stream syntax of slice layer is shown in Table 2. "slice_start_code" is x00000101~x000001AF and the lower order 8 bits indicate Slice Vertical Position on the entire picture frame (N×M) of that slice. In the case where Extra_Slice is used, flag "extra_slice_flag" indicating whether or not that slice is Extra_Slice is transmitted. When Extra_Slice_Status_Flag S28 is set, this "extra_slice_flag" is set to 1.

TABLE 2

```
slice() {
    slice_start_code;                                    32bit;
    quantizer_scale;                                      5bit:
    if(using_extra_slice_flag) {
        extra_bit_slice;                              1bit="1"
        extra_slice_flag;                                 1bit;
        /*"1":extra_slice,"0":not_extra_slice*/
        reserved;                                         7bit;
    }
    while(next_bits()=='1' {
        extra_bit_slice;                              1bit="1"
        extra_information_slice;                          8bit;
    }
    extra_bit_slice;                                  1bit="0"
    do {
        macroblock()
    }while(next_bits()!='0000 0000 0000 0000 0000 0000');
    next_start_code();
}
```

Turning back to FIG. 1, vertical synchronizing signal serving as input picture synchronizing signal is delivered from input terminal 26, and is delivered to reference picture control element 23. Responding to this synchronizing signal, the reference picture control element 23 outputs reference picture indication signal S10 which will be described later to deliver it to field memory group 11.

The field memory group 11 sets picture start flag S22 in synchronism with the leading portion of picture which is to be currently coded and is read out therefrom to deliver it to reference picture control element 24. The reference picture control element 24 outputs reference picture indication signals S12, S13 which will be described later when picture start flag S22 is set to deliver them to field memory group 17.

Moreover, picture start flag S22 is delivered also to output picture control element 25. The output picture control element 25 outputs output picture indication signal S14 which will be described later when picture start flag S22 is set to deliver it to field memory group 17.

Motion predicting circuit (predictor) 12 carries out motion prediction of macro block pixel signal S1 to be currently coded which is delivered from field memory group 11 by making reference to past picture and future picture. Motion prediction is block matching between macro block of macro block pixel signal S1 and each macro block of past picture or future picture to which reference is made. Past and future reference pictures at this time are designated from field memory group 11 in accordance with motion predictive reference picture indication signal S10 outputted from reference picture control element 23. As a result, reference picture signal S11 of reference picture is delivered to motion predicting circuit 12. The motion predicting circuit 12 delivers, as motion vector signal S7, block position within reference picture in the case where predictive error at block matching is minimum to motion compensating circuit (compensator) 18.

Here, when corresponding macro block is macro block (MB) at the picture portion $G_1$, i.e., when it is macro block (MB) within general slice and Extra_Slice_Status_Flag S28 is not set, restriction is placed on the operation of motion predicting circuit 12. In this case, it is inhibited to make reference to picture portion $G_2$, i.e., picture portion $G_2$ of reference picture (within Extra_Slice) at the time of motion prediction. On the other hand, when corresponding macro block is macro block (MB) at picture portion $G_2$, i.e., it is macro block (MB) within Extra_Slice and the Extra_Slice Status_Flag S28 is set, it is not necessarily required to place restriction on the operation of motion predicting circuit 12.

Motion compensating circuit 18 instructs field memory group 17 in which pictures already decoded and reproduced which will be described later are stored to output therefrom block picture signal S3 positioned at an address designated by motion vector signal S7. Reference picture at this time is designated from field memory group 17 in accordance with motion compensation reference picture indication signal S12 outputted from reference picture control element 24. Outputting of block picture signal S3 from motion compensator 18 is adaptive operation. It is thus possible to carry out switching to optimum one of four kinds of operations described below in macro block units.

Namely, modes of four kinds of operations are as follows:

First, motion compensation mode from past reproduction picture;

Secondly, motion compensation mode from future reproduction picture;

Thirdly, motion compensation mode from both past and future reproduction pictures (to carry out linear operation (e.g., mean value calculation) every pixel of reference block from past reproduction picture and reference block from future reproduction picture); and Fourthly, mode of no motion compensation (i.e., intro-coded mode. In this case, output of block picture signal S3 is equal to zero).

It is to be noted that, in the case of I picture, only the fourth motion compensation mode is selectable. Moreover, in the case of P picture, the first and fourth motion compensation modes are selectable. In addition, in the case of B picture, the above-mentioned all motion compensation modes are selectable.

In switching between the modes mentioned above, e.g., mode where sum total of absolute values of difference values every pixel between respective block pixel signals S3 outputted in the above-mentioned four kinds of modes and block pixel signal S1 to be currently coded is minimum is selected. Here, the selected mode is outputted as motion compensation mode signal S9 and motion vector signal S8 at that time.

Block pixel signal S1 to be currently coded which is delivered from field memory group 11 and block pixel signal S3 delivered from motion compensator 18 are caused to undergo calculation to obtain difference value every pixel at subtracter 13. As a result, block difference signal S2 is obtained.

This block difference signal S2 is delivered to block signal coding section 14, resulting in coded signal S4. This coded signal S4 is delivered to block signal decoding section 15, at which it is decoded. Thus, block reproduction difference signal S5 is obtained.

As configuration of the block signal coding section 14, configuration composed of a DCT (Discrete Cosine Transform) element and a quantizer for quantizing output coefficients therefrom by quantization table signal S15 designated from buffer memory 21 may be applied. In this case, as configuration of block signal decoding section 15, configuration composed of an inverse quantizer for inverse-quantizing quantization coefficients by quantization table signal S15 and an inverse DCT element for allowing output coefficients therefrom to undergo inverse DCT processing.

The above-mentioned block reproduction difference signal 55 is added, every pixel, to block picture signal S3 outputted from motion compensator 18 at adder 16. As a result, block reproduction signal S6 is obtained.

This block reproduction signal S6 is stored into field memory designated by current picture indication signal S13 from field memory group 17. Designated reproduction picture of reproduction pictures stored in the field memory group 17 is outputted from terminal 29 in accordance with the previously described output picture indication signal S14.

On the other hand, block signal S4 is delivered to one-dimensional signal generating section 19, at which it is stored in one dimensional array. Thus, one-dimensional coded signal S16 is obtained.

The one-dimensional generating signal section 19 is comprised of, e.g., a scan converter for implementing so called zigzag scanning to block quantization DCT coefficients in order of coefficients from low frequency to high frequency.

Moreover, the above-mentioned coded signal S16 is converted into variable length code such as Huffman code, etc. at VLC element (Variable Length Coding Element) 20 along with motion vector signal S8, motion compensation mode signal S9, and quantization table signal S15, etc. They are stored into buffer memory 21. Thereafter, bit stream is sent from output terminal 22 at a predetermined transmission rate.

Moving picture coding apparatus is constructed in a manner stated above, thus to carry out coding of moving picture, output of bit stream, and output of coded picture.

A moving picture decoding apparatus (decoder) to which a moving picture decoding method of this invention is applied, which corresponds to the coding apparatus of the embodiment to which the above-described moving picture coding method of this invention is applied will now be described with reference to FIG. 5.

Figure 5:
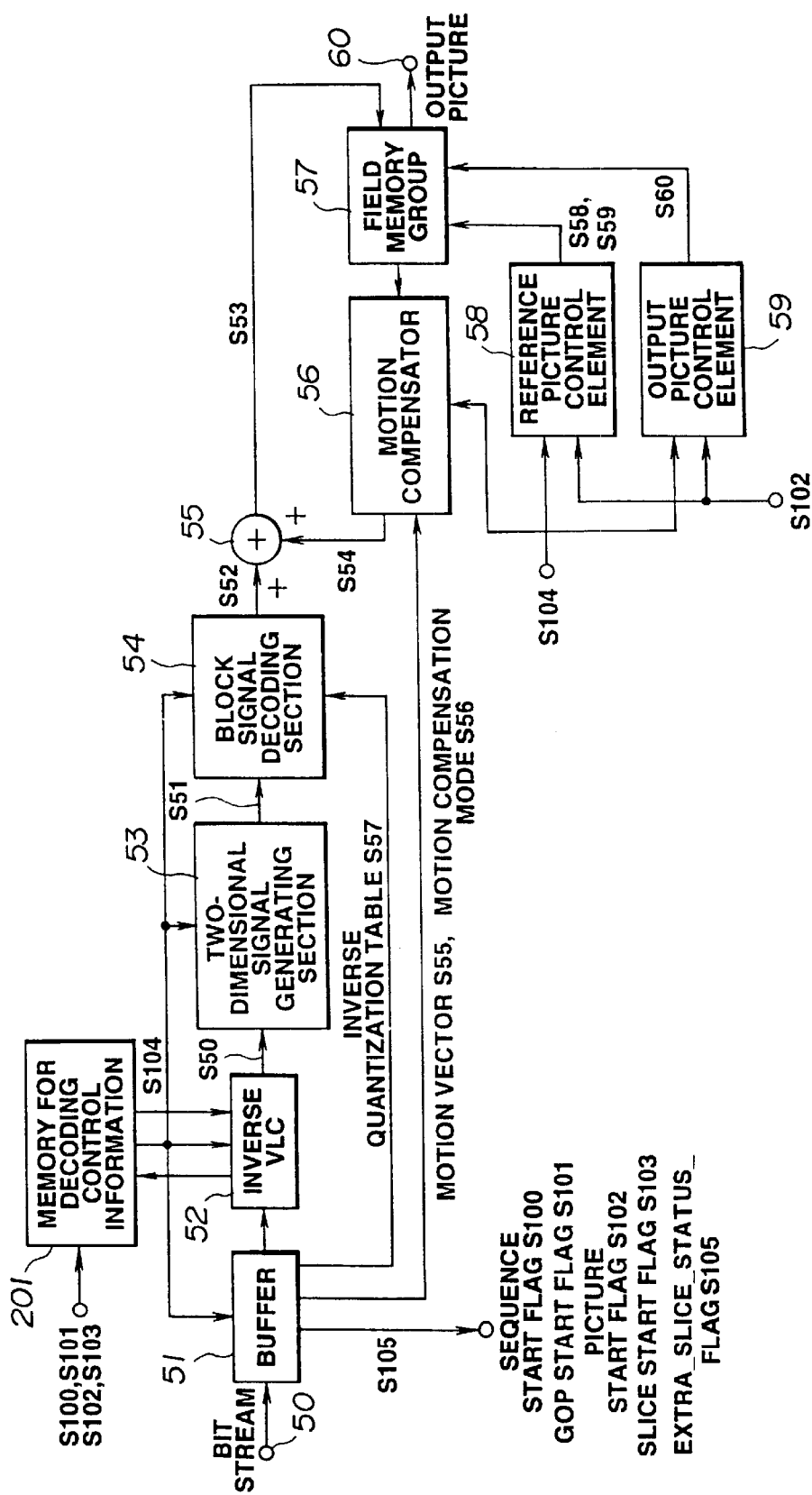
FIG. 5 is a circuit diagram showing, in a block form, a moving picture decoding apparatus in the first embodiment of this invention.

In FIG. 5, bit stream signal inputted from input terminal 50 is stored into buffer memory 51, and is then delivered to inverse VLC element 52.

As explained on the coding apparatus side, bit stream is composed of six layers, i.e., video sequence layer, GOP layer, picture layer, slice layer, macro block layer, and block layer.

In the case of video sequence layer, GOP layer, picture layer and slice layer, start codes indicating that respective layers begin, which are attached to the leading portions of respective layers, are first received, and header information for controlling decoding of picture are then received.

Inverse VLC element 52 decodes header information of respective layers when it receives respective start codes to store control information for decoding of pictures thus obtained into memory 201. Information stored in memory 201 controls the moving picture decoding apparatus as control information S104 to decode pictures in a manner described below.

Namely, the inverse VLC element 52 sets sequence start flag S100 when it detects the leading portion of sequence to be decoded, thus to decode header information. Bit stream syntax in the sequence layer is as shown in the above-mentioned Table 1. Also in this case, as shown in the Table 1 and the FIG. 4 mentioned above, lateral size (i.e., N) and longitudinal size (i.e., M) of picture frame can be recognized by flag expressed as "horizontal_size_value ", "vertical_size_value". Moreover, whether or not Extra_Slice is used can be recognized by flag expressed as "using_extra_slice_flag". In the case where Extra_Slice is used, lateral size and longitudinal size of picture portion $G_1$ can be recognized by "inner_mb_width", "inner_mb_height".

Namely, $N_1$=inner_mb_width×16

$M_1$=inner_mb_height×16

Thus, it is seen that even in the case where the receiving side only has processing ability of $N_1$ pixels×$M_1$ lines, it is possible to reproduce only picture portion $G_1$.

Further, position information of picture portion $G_1$ within N pixels×M lines of the entire picture frame can be recognized by "offset_slice_horizontal_position", "offset_slice_vertical_position".

When inverse VLC element 52 detects the leading portion of picture to be decoded, it sets picture start flag S102 to deliver it to reference picture control element 58. The reference picture control element 58 outputs reference picture indication signals S58, S59 which will be described later when picture start flag S102 is set to deliver them to field memory group 57.

Moreover, similarly to the above, picture start flag S102 is delivered to output picture control element 59. The output picture control element 59 outputs output picture indication signal S60 which will be described later when picture start flag S102 is set to deliver it to field memory group 57.

The inverse VLC element 52 sets slice start flag S103 when it detects the leading portion of slice. Bit stream syntax of slice layer is as shown in the Table 2 mentioned above. In the case where Extra_Slice is used, "extra_slice_flag" of flag indicating whether or not that slice is Extra_Slice is received. At this time, in the case where the extra_slice_flag is "1", Extra_Slice_Status_Flag S105 is set. On the other hand, in the case where extra_slice_flag is "0", Extra_Slice_Status_Flag S105 is reset.

Here, in the case where the receiving side has only processing ability of picture frame of $N_1$ pixels×$M_1$ lines, when the Extra_Slice_Status_Flag S105 is "1", inverse VLC 52 reads, in a skipped manner, data of that slice layer to carry out search for the next start code. On the other hand, when the Extra_Slice_Status_Flag S105 is "0", decoding of slice data is carried out.

"slice_start_code" is x00000101~x000001AF, and the lower order 8 bits indicate SVP(Slice Vertical Position) on the entire picture frame (N×M) of that slice. At the leading portion of slice, the first macro block has data indicating SHP (Slice_Horizontal_Position) on the entire picture frame (N×M). With respect to the vertical and horizontal positions (SVP, SHP) thus obtained, it is necessary to remove their offset positions. These offset information are given by "offset_slice_horizontal_position", "offset_slice_vertical_position", which have been already obtained in the sequence layer (see FIG. 4).

Accordingly, at the time of decoding slice data, decoding apparatus for reproducing only picture portion $G_1$ carries out an operation described below:

SVP=SVP-offset_slice_vertical_position

SHP=SHP-offset_slice_horizontal_position

It is to be noted that GOP start flag S101 is also outputted from the inverse VLC element 52.

Coded block signal S50 which has been taken out from inverse VLC element 52 is delivered to two-dimensional signal generating section 53, at which two-dimensional block signal S51 is obtained. The two-dimensional block signal S51 is delivered to block signal decoding section 54, at which it is decoded. Thus, block reproduction difference signal S52 is obtained.

As configuration of the block signal decoding section 54, configuration composed of an inverse quantizer for inverse-quantizing quantization coefficients by quantization table signal S57 which has been taken out from inverse VLC element 52 and an inverse DCT element for allowing output coefficients therefrom to undergo inverse DCT (Discrete Cosine Transform) processing may be applied.

As configuration of the two-dimensional signal generating section 53, configuration comprised of an inverse scan converter for implementing inverse zigzag scanning to coded block signal S50 in order of coefficients from low frequency to high frequency may be applied.

On the other hand, motion vector signal S55, motion compensation mode signal S56 belonging to macro block to be currently decoded which has been taken out from inverse VLC element 52 are inputted to motion compensator 56. Responding to these inputs, motion compensator 56 instructs field memory group 57 in which pictures already decoded and reproduced are stored to output corresponding block picture signal therefrom.

In more practical sense, the motion compensator 56 recognizes, as reference picture, reproduction picture designated from field memory group 57 by the previously described reference picture indication signal S58 to instruct output of block picture signal positioned at address within reference picture designated by motion compensation mode signal S56 and motion vector signal S55.

In this embodiment, since picture portion $G_1$ is coded with the predictive range being limited in the coding apparatus, address within reference picture indicated by motion compensator 56 is substantially limited to the area of picture portion $G_1$ of reproduction picture at the time of coding picture portion $G_1$.

Motion compensator 56 carries out adaptive operation corresponding to motion compensation mode signal S56, i.e., carries out four kinds of operations described below in macro block units. Size of macro block is, e.g., 16×16 pixels.

Namely, as modes of four kinds of operations, there are modes described below similarly to the previously described case:

First, motion compensation mode from past reproduction picture;

Secondly, motion compensation mode from future reproduction picture;

Thirdly, motion compensation mode from both past and future reproduction pictures (to carry out linear operation (e.g., mean value calculation) every pixel of reference block from past reproduction picture and reference block from future reproduction picture); and Fourthly, mode of no motion compensation (i.e., intra-coded mode. In this case, output of block picture signal S54 is equal to zero).

Block reproduction difference signal S52 is added every pixel at adder 55 to block picture signal S54 outputted from motion compensator 56. As a result, block reproduction signal S53 is obtained. This block reproduction signal S53 is stored into field memory designated by current picture indication signal S59 from within field memory group 57.

In a manner stated above, moving picture decoding apparatus is constructed, thus to reproduce picture from bit stream. This reproduction picture is outputted as output picture from terminal 60.

Figure 6:
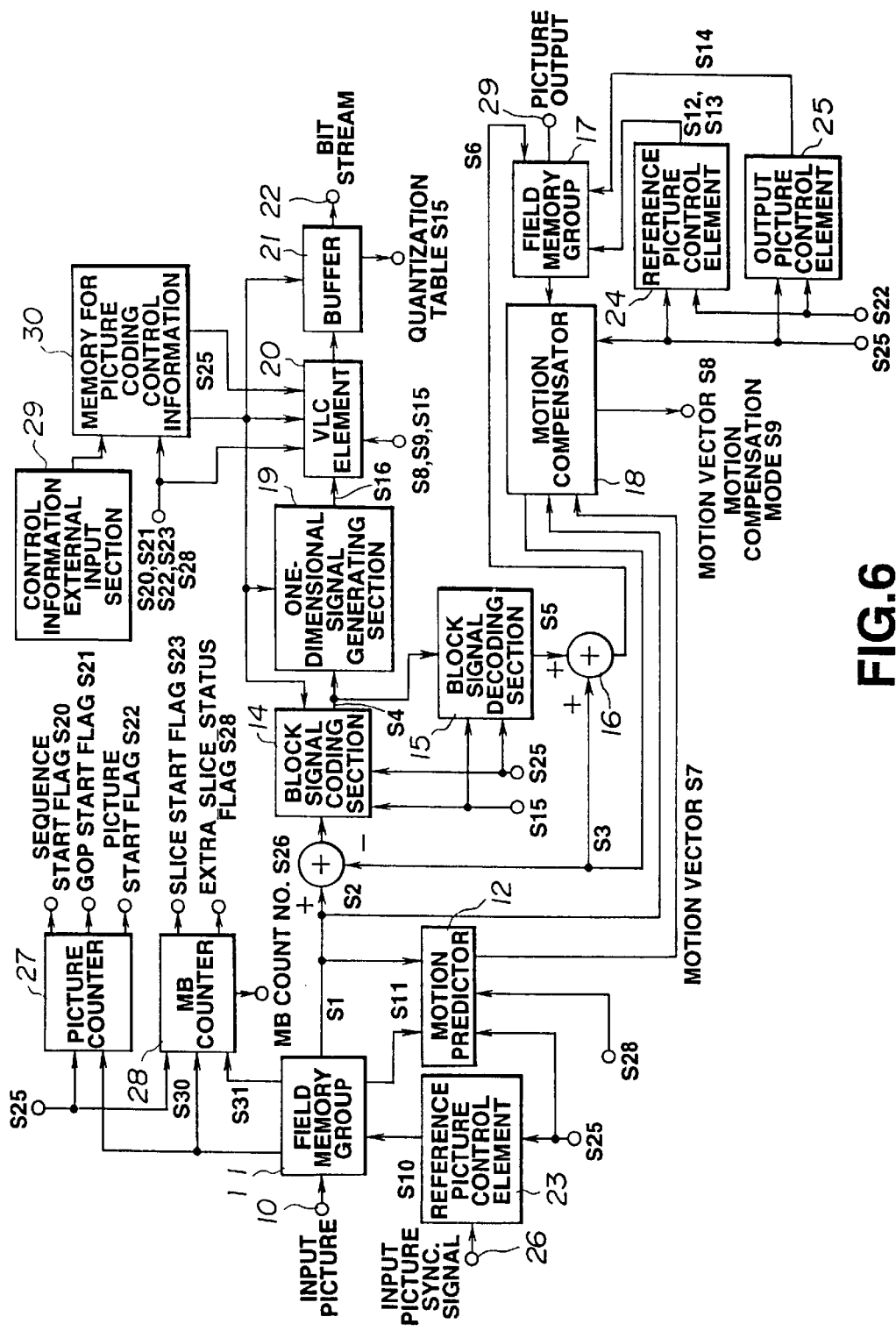
FIG. 6 is a circuit diagram showing, in a block form, a moving picture coding apparatus in a second embodiment.

A moving picture coding apparatus (encoder) of a second embodiment will now be described in accordance with FIGS. 6 and 7 with respect to differences between this embodiment and the above-described first embodiment. It should be noted that since respective components of FIG. 6 are substantially similar to those of FIG. 1, their explanation is omitted here.

Figure 7A:
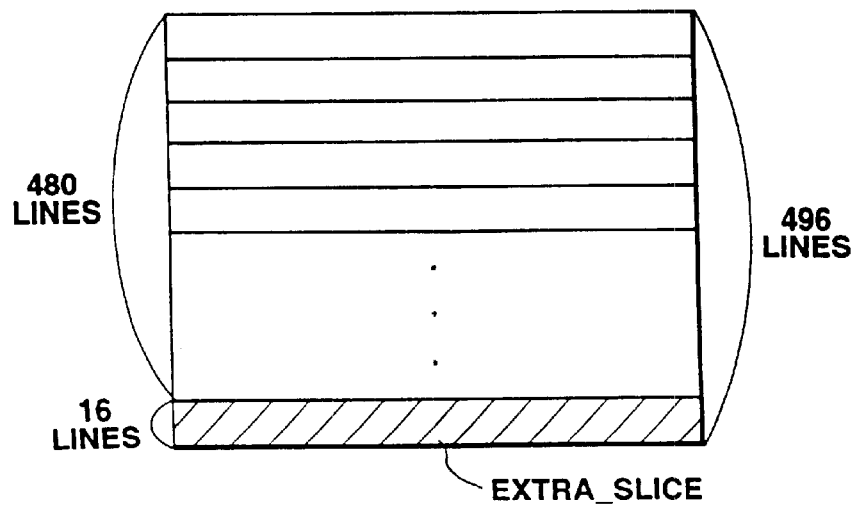
FIG. 7 is a view for explaining handling of picture at the frame structure in the second embodiment.
Figure 7B:
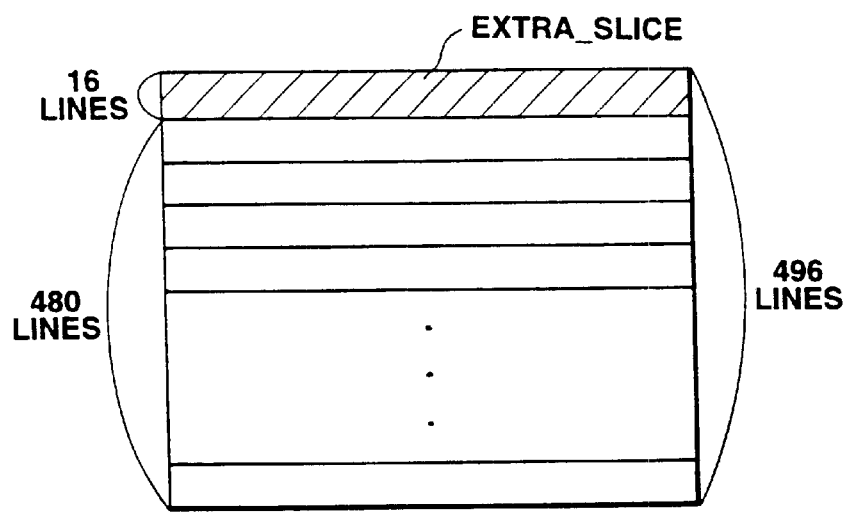

The coding apparatus of this embodiment handles picture as indicated by A and B of FIG. 7. Namely, the upper $N_1$ lines of picture ($N_1$ is multiple of 16, e.g., 480, etc.) are comprised of one general slice or more, and 16 lines of the lowest portion are comprised of one Extra_Slice or more. Extra_Slice is composed of Macro Blocks (MB) similarly to general slice. It is to be noted that lower $N_1$ lines of picture may be comprised of general slices, and the highest 16 lines may be constructed as Extra_Slice. In addition, the Extra_Slice is only allowed by one stripe (one lateral row of macro block on picture).

Bit stream syntax of sequence layer is shown in Table. 3.

TABLE 3

```
sequence_header() {
    sequence_header_code;                                       32bit;
    horizontal_size_value;                                      12bit;
    vertical_size_value;                                        12bit;
    pel_aspect_ratio;                                           4bit;
    picture_rate;                                               4bit;
    bit_rate;                                                   18bit;
    marker_bit;                                                 1bit;
    vbv_buffer_size;                                            10bit
    constrained_parameter_flag;                                 1bit;
    load_intra_quantizer_matrix;                                1bit;
    if(load_intra_quantizer_matrix)
        intra_quantizer_matrix[64];                             8*64bit;
    load_non_intra_quantizer_matrix;                            1bit;
    if(load_non_intra_quantizer_matrix)
        non_intra_quantizer_matrix[64];                         8*64bit;
    next_start_code();
    if(next_bits()==extension_start_code) {
        extension_start_code;                                   32bit;
        picture_structure;                                      1bit;
        using_extra_slice_flag;                                 1bit;
        extra_slice_vertical_position;                          1bit;
        reserved(byte_align);
        while(next_bits()!='0000 0000 0000 0000 0000 0001') {
            sequence_extension_data;                            8bit;
        }
        next_start_code();
    }
    if(nextbits()=user_data_start_code) {
        user_data_start_code;                                   32bit;
        while(next_bits()!='0000 0000 0000 0000 0000 0001') {
            user data;                                          8bit;
        }
        next_start_code();
    }
}
```

In this Table 3, longitudinal size of picture frame is transmitted by "vertical_size_value".

Moreover, information indicating whether or not Extra_Slice is used is transmitted by flag expressed as "using extra_slice_flag". Further, position on picture of Extra_Slice is transmitted by "extra_slice_vertical_position". Whether the highest portion of picture is Extra_Slice or not, and whether the lowest portion of picture is Extra_Slice or not are discriminated by "1", "0" of the "extra_slice_vertical_position", respectively.

Bit stream syntax of slice layer is shown in Table 4.

TABLE 4

```
slice() {
    slice_start_code;                                           32bit;
    quantizer_scale;                                            5bit;
    while(next_bits()=='1') {
        extra_bit_slice;                                        1bit="1"
        extra_information_slice;                                8bit;
    }
    extra_bit_slice;                                            1bit="0"
    do {
        macroblock();
    }while(next_bits()!='0000 0000 0000 0000 0000 0000');
    next_start_code();
}
```

Further, start code Table is shown in Table 5.

TABLE 5

| name | hexadecimal value |
| --- | --- |
| picture_start_code | 00000100 |
| slice_start_codes (including slice_vertical_positions) | 00000101 through 000001AF |
| extra_slice_start_code | 000001B0 |
| reserved | 000001B1 |
| user_data_start_code | 000001B2 |
| sequence_header_code | 000001B3 |
| sequence_error_code | 000001B4 |
| extension_start_code | 000001B5 |
| reversed | 000001B6 |
| sequence_end_code | 000001B7 |
| group_start_code | 000001B8 |
| system start code(see note) | 000001B9 through 000001FF |

NOTE
system start codes are defined in Part 1CD 11172

In the above Table 5, start code of general slice is x00000101~x000001AF, and start code of Extra Slice is x000001B0. In general slice, the lower order 8 bits of start code indicate vertical position (Slice_Vertical_Position) of that slice on "picture except for Extra_Slice".

When Extra_Slice_Status_Flag S28 is set, start code of Extra_Slice is transmitted. In contrast, when Extra_Slice_Status_Flag S28 is not set, start code of general slice is transmitted.

The differences between the coding apparatus of the second embodiment and the coding apparatus of the first embodiment have been described above.

A moving picture decoding apparatus (decoder) corresponding to the above-described coding apparatus of the second embodiment will now be described in accordance with FIG. 8 with respect to differences from the decoding apparatus of the first embodiment. It is to be noted that, in FIG. 8, the same reference numerals are respectively attached to components similar to those of FIG. 5, and their explanation is omitted.

Figure 8:
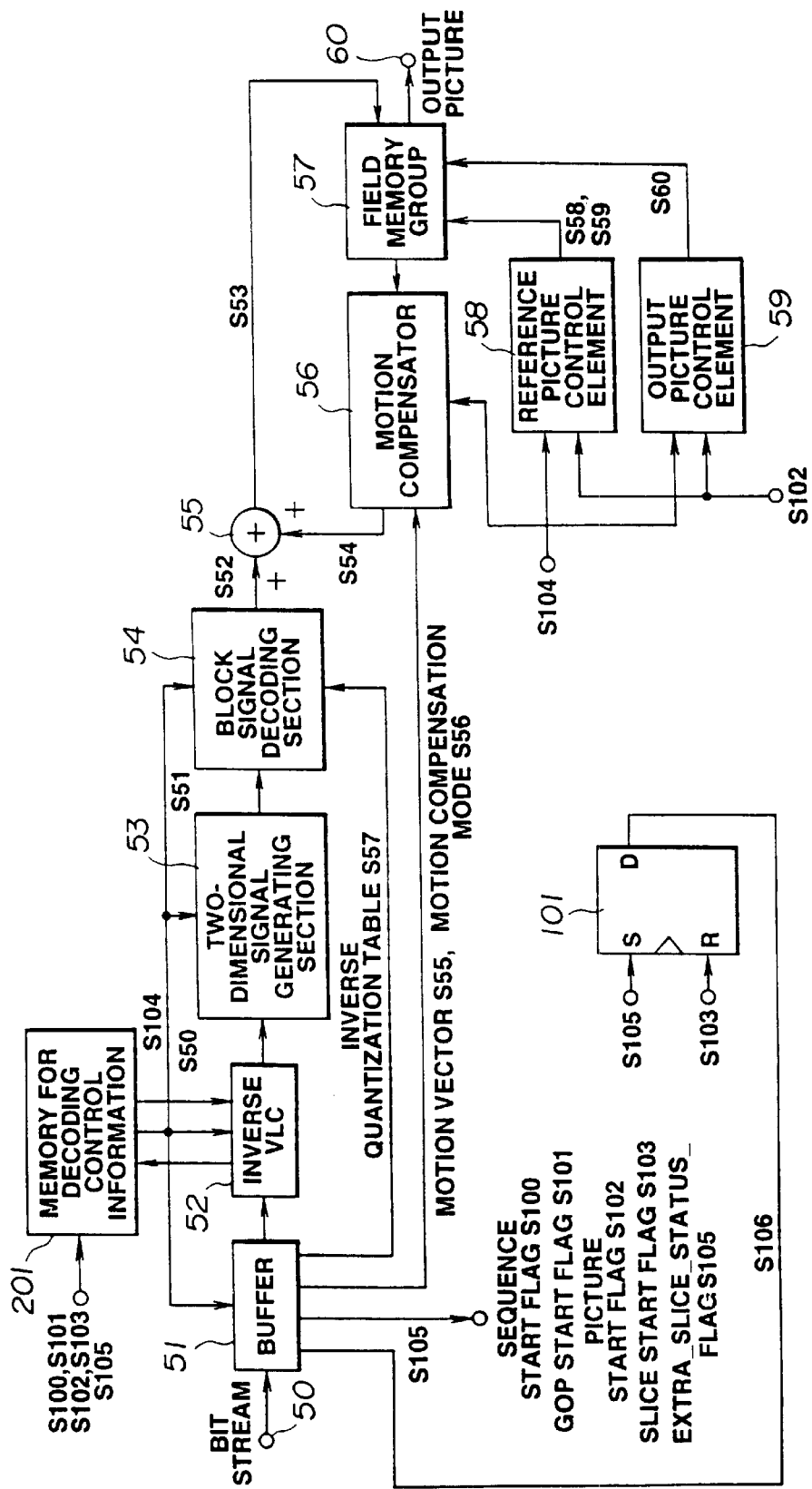
FIG. 8 is a circuit diagram showing, in a block form, a moving picture decoding apparatus in the second embodiment.

In FIG. 8, inverse VLC element 52 sets sequence start flag S100 when it detects the leading portion of sequence to be decoded to decode header information. Bit stream syntax in the sequence layer is as shown in the Table 3 mentioned above. In this case, longitudinal size of picture frame can be recognized by "vertical_size_value". In addition, whether or not Extra_Slice is used is discriminated by flag expressed as "using_extra_slice_flag".

When "vertical_size_value" is 496 lines and "using_extra_slice_flag" is "1", it is seen that even in the case where the receiving side is decoding apparatus only having processing ability of picture frame of 480 lines, only the decodable picture portion can be reproduced.

Moreover, position on picture of Extra_Slice can be recognized by "extra_slice_vertical_position". Whether the highest portion of picture is Extra_Slice or not, and whether the lowest portion of picture is Extra_Slice or not are respectively discriminated by "1", "0" of "extra_slice_vertical_position".

Inverse VLC element 52 respectively sets slice start flag S103 and Extra_Slice_Start_Flag S105 when it detects the leading portion of general slice and the leading portion of Extra_Slice, respectively. Bit stream syntax of slice layer is as shown in the Table 4 mentioned above. Further, start code Table is as shown in the Table 5 mentioned above. Start code of general slice is x00000101~x000001AF, and start code of Extra_Slice is x000001B0. In general slice, the lower order 8 bits of start code indicate vertical position of that slice (Slice_Vertical_Position) on "picture except for Extra_Slice".

Slice start flag S103 and Extra_Slice_Status_Flag S105 are delivered to Set/Reset flip-flop 101. When the Extra_Slice_Status_Flag S1O5 is "1", flag S106 is set to "1". On the other hand, when slice start flag S103 is "1", flag S106 is set to "0". When flag S106 is "1", in the case where decoding apparatus of this embodiment has an ability to handle only picture of picture frame of frame of 720 pixels×480 lines, inverse VLC element 52 reads, in a skipped manner, data of Extra_Slice layer, thus to carry out search for the next start code.

The differences between the decoding apparatus of the second embodiment and that of the first embodiment have been described above.

Finally, a method of transmitting Extra_Slice as a third embodiment in the case where input picture is interlaced signal, and picture structure is field structure will now be described by taking an example of a coding apparatus (encoder) of modification of the above-described embodiment.

Figure 9A:
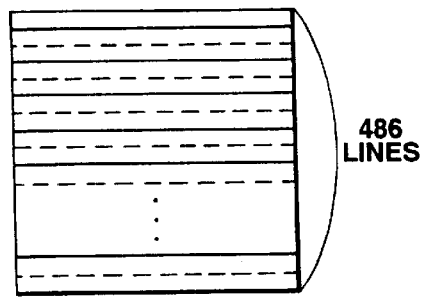
FIG. 9 is a view for explaining conventional handling of picture of the field structure.
Figure 9B:
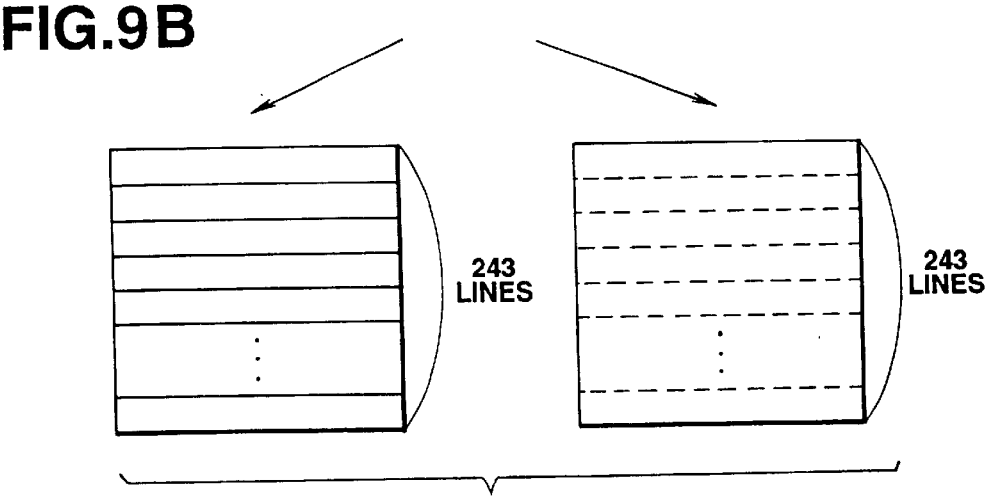
Figure 9C:
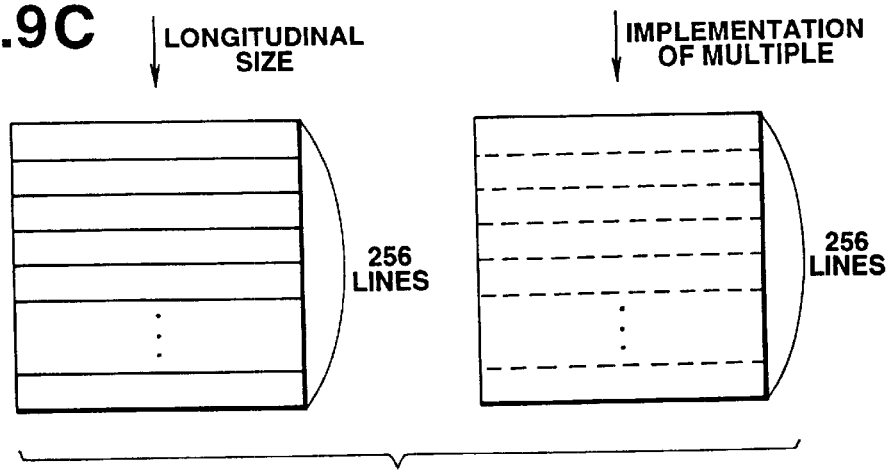
Figure 13:
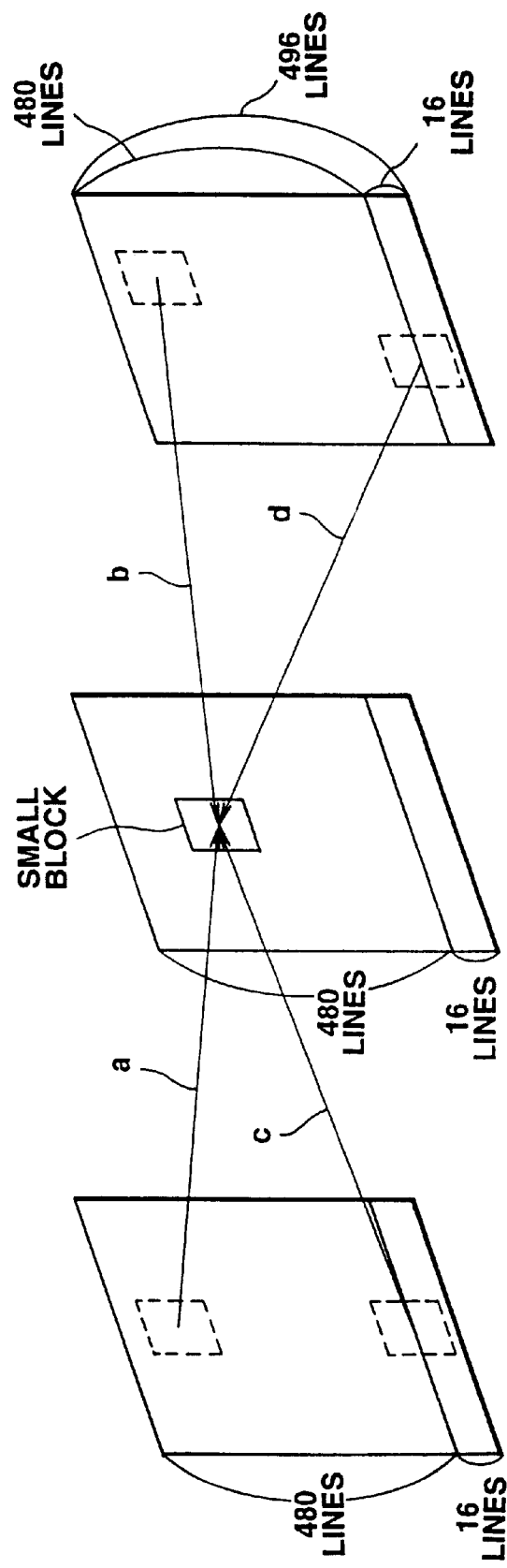
FIG. 13 is a view for explaining the problem in the case where when the receiving side is a decoding apparatus having only processing ability of picture frame of 480 lines, an attempt is made to decode coded information of picture frame of 496 lines.

In the case where picture structure is field structure (see A of FIG. 9), picture of field $FD_1$ and picture of field $FD_2$ are independently coded as indicated by B of FIG. 9. Accordingly, for example, interlaced picture of 486 lines at picture frame of frame consists of picture of field $FD_1$, and picture of field $FD_2$ of 243 lines. For this reason, in the case of carrying out coding by using motion compensating predictive coding such as MPEG, handling is carried out under the condition where longitudinal size is assumed to be multiple of 16 and respective pictures are assumed to be 256 lines (240+16 lines) as indicated by C of FIG. 9. However, such a handling was problem in that since processing of 512 lines (256+256) is carried out at picture frame of frame, increase in the coding processing ability of about 7% was required as compared to the case where frame of 480 lines is handled.

In this embodiment, in the case where picture structure is field structure as shown in FIG. 10, 8 lines of field $FD_1$ and 8 lines of field $FD_2$ of A and C of FIG. 10 are synthesized to constitute Extra_Slice of 16 lines as indicated by B and D of FIG. 10. At this time, there are assumed the case where Extra_Slice is frame structure and the case where the upper 8 lines are field $FD_1$ as indicated by A of FIG. 10 and the lower 8 lines are field $FD_2$ as indicated by C of FIG. 10 (or combination opposite to the above). By taking into consideration good coding efficiency and easiness of handling, Extra_Slice is dealt as frame structure in this embodiment.

In this case, interlaced picture of 496 lines at picture frame of frame consists of picture of field $FD_1$ and picture of field $FD_2$ of 240 lines comprised of general slices, and Extra_Slice of the frame structure of 16 lines. Extra_Slice is transmitted at the highest portion or the lowest portion of picture of field $FD_2$. It is to be noted that Extra_Slice is only allowed by one stripe on one picture (lateral one row of macro block on picture).

The differences between the third embodiment and the second embodiment will now be described in accordance with the circuit diagram shown in a block form in FIG. 6.

Bit stream syntax of the sequence layer is as shown in the Table 3 mentioned above. Longitudinal size of picture frame is transmitted by "vertical_size_value".

Moreover, discriminator relating to structure of picture is transmitted by "picture_structure". In the case where "picture_structure"="0", structure of picture is frame structure. On the other hand, in the case where "picture_structure"="1", structure of picture is field structure.

Moreover, information indicating whether or not Extra_Slice is used is transmitted by flag expressed as "using_extra_slice_flag". Further, position on picture of Extra Slice is transmitted by "extra_slice_vertical_position". Codes for respectively discriminating whether or not the highest portion of picture of field $FD_2$ is Extra_Slice and whether or not the lowest portion thereof is Extra_Slice by "1", "0" of "extra_slice_vertical_position" are transmitted.

It is to be noted that while Extra_Slice is added to picture of field $FD_2$ in this embodiment, it may be added to picture of field $FD_1$.

The differences between the coding apparatus of the third embodiment and that of the second embodiment have been described above.

A moving picture decoding apparatus (decoder) corresponding to the above-described coding apparatus of the third embodiment will now be described with reference to FIG. 8 with respect to differences from the second embodiment.

Inverse VLC element 52 sets sequence start flag S100 when it detects the leading portion of sequence to be decoded, thus to decode header information. Bit stream syntax in the sequence layer is as shown in the Table 3 mentioned above. Longitudinal size of picture frame can be recognized by "vertical_size_value". Further, whether or not Extra_Slice is used is discriminated by flag expressed as "using_extra_slice_flag". It is seen that when "vertical_size_value" is 496 lines and "using_extra_slice_flag" is "1", even in the case where there is employed decoding apparatus only having processing ability of picture frame of 480 lines, only its decodable picture portion can be reproduced.

In addition, position on picture of Extra_Slice can be recognized by "extra_slice_vertical_position". Whether or not the highest portion of picture of field $FD_2$ is Extra_Slice and whether or not the lowest portion thereof is Extra_Slice are respectively discriminated by "1", "0" of "extra_slice_vertical_position".

The differences between the decoding apparatus of the third embodiment and that of the second embodiment have been described above.

Industrial Applicability

In this invention, as described above, it is possible to provide moving picture coded information (broadcasting) having flexibility such that, for example, in the case where the receiving side has decoding processing ability of picture frame of 483 lines or more, received all picture signals can be reproduced, while in the case where the receiving side only has decoding processing ability of picture frame of 480 lines, only its decordable picture portion can be reproduced.

Accordingly, it is possible to take out only picture information of reproducible picture frame from received coded information. For example, in the coding method using motion compensating prediction between pictures, e.g., MPEG, etc., pictures have correlation therebetween in a time base direction. For this reason, in the case where reference is made to the outside portion of reproducible picture frame by motion compensation, motion compensation is caused to be unable, thus permitting decoding to be disabled.

What is claimed is:

1. A moving picture coding method using motion compensating prediction, comprising:
   dividing a first picture into first and second regions, said first region has a first fixed position and said second region has a second fixed position and said first and second regions have the same fixed positional relationship from frame to frame for a plurality of consecutive frames;
   coding at least the first region of the first picture; and
   implementing motion compensation prediction to a second picture following the first picture only from the first region of the first picture to encode the second picture,
   whereby the first region of the second picture is coded and the second region of the second picture is not coded.

2. The moving picture coding method as set forth in claim 1, wherein a slice of the first region includes at least one macroblock.

3. The moving picture coding method as set forth in claim 2, wherein a macroblock located at a leading portion of said slice contains data indicating a position of said slice within said first picture.

4. The moving picture coding method as set forth in claim 3, wherein a length of said slice and said position of said slice are arbitrary.

5. The moving picture coding method as set forth in claim 2, wherein said macroblock has a plurality of blocks including a luminance block and a color difference block.

6. The moving picture coding method as set forth in claim 1, wherein discrimination codes for discriminating between the first and second regions are added to respective headers.

7. A moving picture decoding method for decoding a coded signal of a moving picture using motion compensating prediction, comprising:
   decoding, from a coded signal of a first picture divided into first and second regions, at least the first region, said first region has a first fixed position and said second region has a second fixed position and said first and second regions have the same fixed positional relationship from frame to frame for a plurality of consecutive; and
   implementing motion compensating prediction to a coded signal of a second picture following the first picture only from a decoded signal of the first region of the first picture,
   whereby the first region of the second picture is decoded and the second region of the second picture is not decoded.

8. The moving picture decoding method as set forth in claim 7, wherein a slice of the first region includes at least one macroblock.

9. The moving picture decoding method as set forth in claim 8, wherein a macroblock located at a leading portion of said slice contains data indicating a position of said slice within said first picture.

10. The moving picture decoding method as set forth in claim 9, wherein a length of said slice and said position of said slice are arbitrary.

11. The moving picture decoding method as set forth in claim 8, wherein said macroblock has a plurality of blocks including a luminance block and a color difference block.

12. The moving picture decoding method as set forth in claim 7, wherein discrimination between the first and second regions is made in response to discrimination codes added to respective headers.

13. A moving picture coding apparatus using motion compensating prediction, comprising:
   means for dividing a first picture into first and second regions, said first region has a first fixed position and said second region has a second fixed position and said first and second regions have the same fixed positional relationship from frame to frame for a plurality of consecutive frames;
   means for coding at least the first region of the first picture; and
   means for implementing motion compensating prediction to a second picture following the first picture only from the first region of the first picture to encode the second picture,
   whereby the first region of the second picture is coded and the second region of the second picture is not coded.

14. The moving picture coding apparatus as set forth in claim 13, wherein a slice of the first region includes at least one macroblock.

15. The moving picture coding apparatus as set forth in claim 14, wherein a macroblock located at a leading portion of said slice contains data indicating a position of said slice within said first picture.

16. The moving picture coding apparatus as set forth in claim 14, wherein a length of said slice and said position of said slice are arbitrary.

17. The moving picture coding apparatus as set forth in claim 14, wherein said macroblock has a plurality of blocks including a luminance block and a color difference block.

18. The moving picture coding apparatus as set forth in claim 13, further including means for adding discrimination codes for discriminating between the first and second regions to respective headers.

19. A moving picture decoding apparatus for decoding a coded signal of a moving picture using motion compensating prediction, comprising:
   means for decoding, from a coded signal of a first picture divided into first and second regions, at least the first region, said first region has a first fixed position and said second region has a second fixed position and said first and second regions have the same fixed positional relationship from frame to frame for a plurality of consecutive frames; and
   means for implementing motion compensating prediction to a coded signal of a second picture following the first picture only from a decoded signal of the first region of the first picture,
   whereby the first region of the second picture is decoded and the second region of the second picture is not decoded.

20. The moving picture decoding apparatus as set forth in claim 19, wherein a slice of the first region includes at least one macroblock.

21. The moving picture coding apparatus as set forth in claim 20, wherein a macroblock located at a leading portion of said slice contains data indicating a position of said slice within said first picture.

22. The moving picture coding apparatus as set forth in claim 21, wherein a length of said slice and said position of said slice are arbitrary.

23. The moving picture coding apparatus as set forth in claim 20, wherein said macroblock has a plurality of blocks including a luminance block and a color difference block.

24. The moving picture decoding apparatus as set forth in claim 19, further including means for discriminating between the first and second regions in response to discrimination codes added to respective headers.

* * * * *